July 1, 1958  C. G. RAMSEY  2,840,954
MACHINE FOR PRESS MOLDING GLASSWARE
Filed Nov. 21, 1955  3 Sheets-Sheet 1

INVENTOR.
Cleabert G. Ramsey
BY
ATTORNEYS

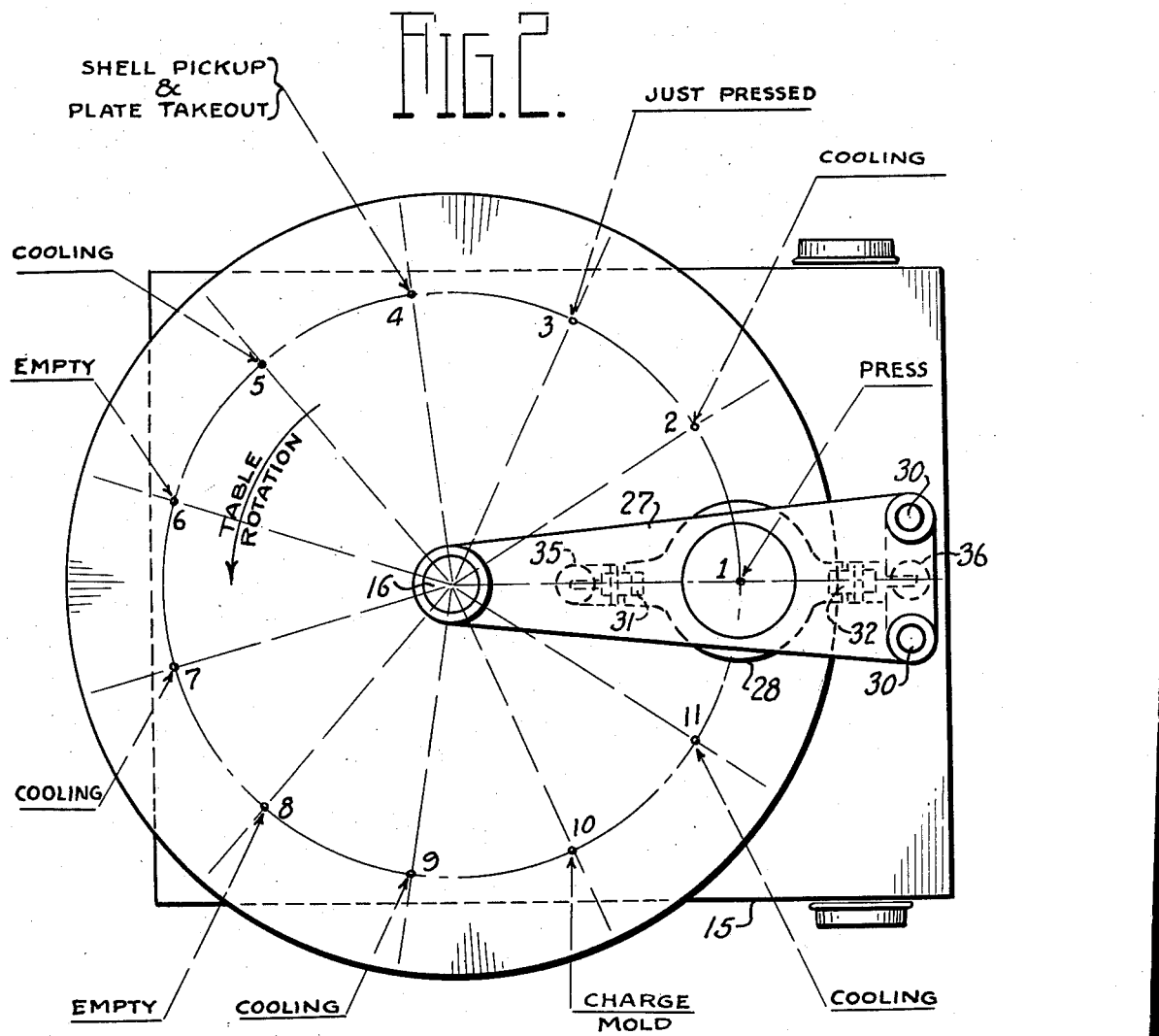

July 1, 1958  C. G. RAMSEY  2,840,954
MACHINE FOR PRESS MOLDING GLASSWARE
Filed Nov. 21, 1955  3 Sheets-Sheet 3
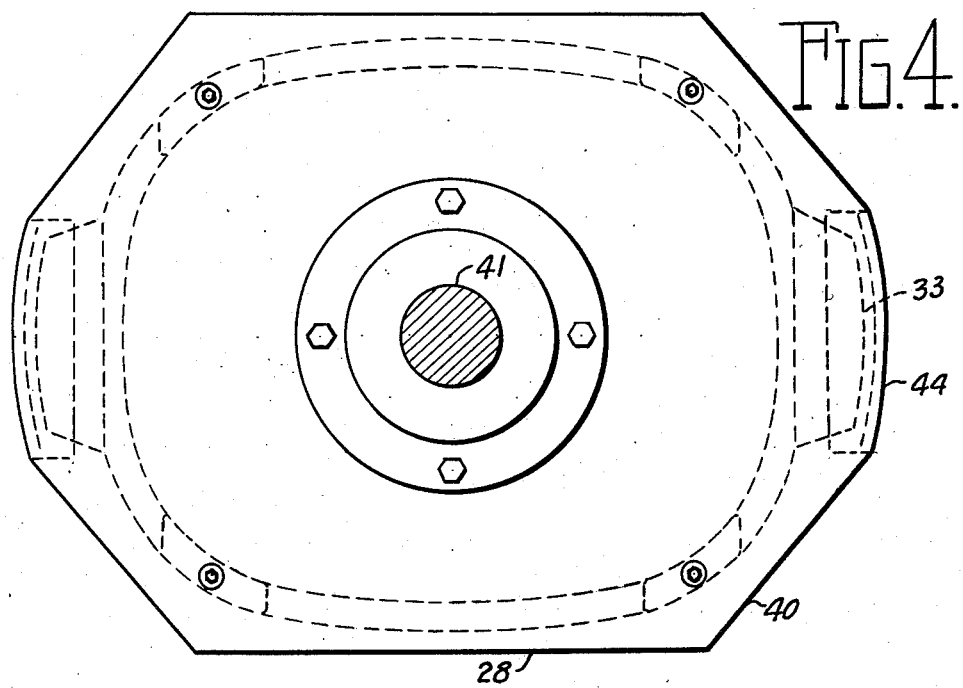
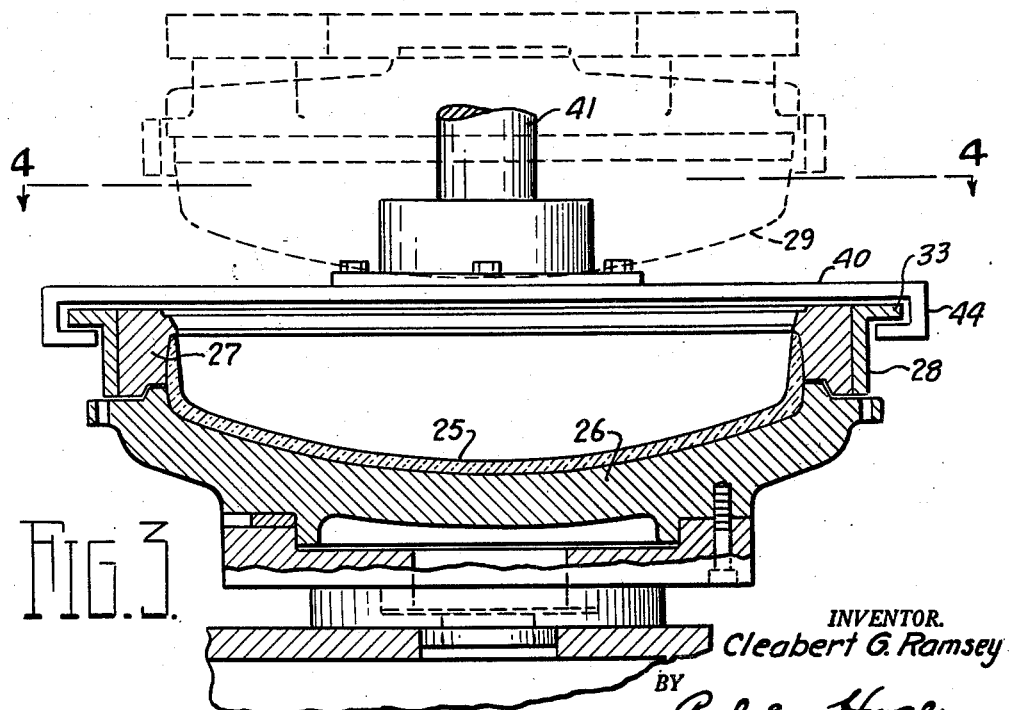
INVENTOR.
Cleabert G. Ramsey
BY
ATTORNEYS United States Patent Office 2,840,954
Patented July 1, 1958

2,840,954

MACHINE FOR PRESS MOLDING GLASSWARE

Cleabert G. Ramsey, Columbus, Ohio, assignor to Owens-Illinois Glass Company, a corporation of Ohio Application November 21, 1955, Serial No. 548,071

4 Claims. (Cl. 49—37)

My invention relates to machines for molding glass and particularly to a type of machine by which glass articles are formed in molds by a press plunger or ram. An object of the invention is to provide a novel form of clamping means by which the mold components are clamped together and held during the molding of the glass by the press plunger, and until after the plunger has been retracted.

The invention in its preferred form as herein illustrated is embodied in a press molding machine designed for molding face plates for television picture tubes although the machine may be designed and used for molding various other forms of glassware. The machine as shown comprises a mold table intermittently rotated, step by step, about a vertical axis and molding units on the mold table which are brought in succession to a press molding station. Each molding unit comprises a body mold and a ring mold for molding the rim of the article. An outer ring or "shell" surrounds the ring mold and serves as a means for lifting the latter from the body mold leaving the molded article free for removal. A further object of the invention is to provide means for lifting the ring mold and shell assembly at the take-out station.

Other objects and the nature of the invention will appear more fully hereinafter.

Referring to the accompanying drawings:

Fig. 2 is a diagrammatic plan view of the machine;

Fig. 3 is a sectional elevation of a mold and shell assembly on a comparatively large scale; and Fig. 4 is a sectional plan view of the same at the line 4—4 on Fig. 3.

Figure 1:
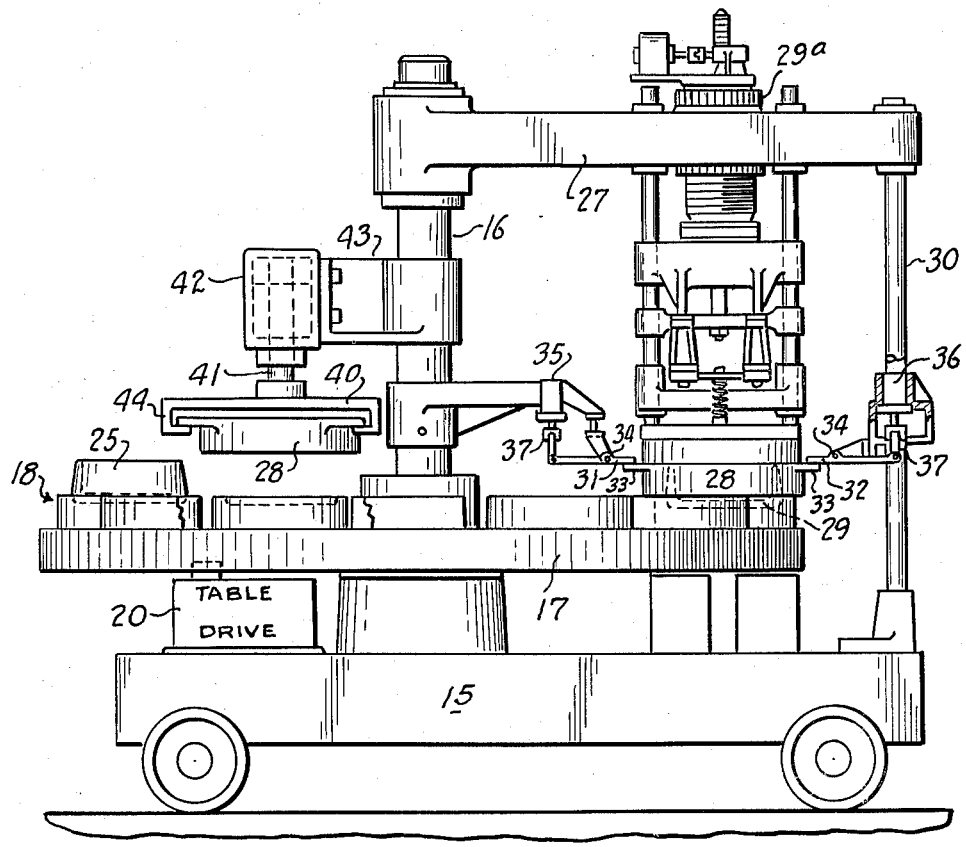
Fig. 1 is an elevational view of the machine, parts being broken away.

Referring to Fig. 1, the machine is mounted on a base 15 from which rises a stationary column 16. A mold table 17 has mounted thereon mold units 18 arranged in an annular series around the column 16. The mold table is rotated intermittently, step by step, by means of a table drive mechanism 20 which may be of usual construction well known in the prior art. Each mold unit is brought by the rotation of the mold table to stations numbered 1 to 11 (Fig. 2). These include a mold charging station 10 at which a charge or gob of glass is placed in each mold, a press molding station 1 where the article is press molded, a take-out station 4 at which the article is removed from the mold, intermediate cooling stations at which the article is cooled, and stations at which the mold is empty.

Each step rotation of the mold table is through an angular distance double that between adjoining stations so that the article molded at station 1 makes more than one complete rotation with the mold table before it stops at the take-out station 4. Following the press molding at station 1 each article is held stationary at the cooling stations 3, 5, 7, 9, 11 and 2 in succession before being stopped at the take-out station 4. After removal of the molded article at station 4, the mold remains empty while at stations 6 and 8.

The molds as shown are designed for molding face plates 25 for television picture tubes. Each mold unit comprises a body mold 26 and a ring mold 27 for molding the rim portion of the face plate. The ring 27 is fitted in and surrounded by a metal ring 28 known in the art as a shell.

When a charge of glass has been dropped into the mold at the charging station 10 the next step rotation of the carriage brings the mold directly beneath the press plunger or ram at station 1. The plunger is moved up and down by a fluid operated motor 29$^a$ and includes a press molding head 29 shaped to mold the inner surface of the face plate 25. The plunger head 29 is shown in broken lines in Fig. 3 to indicate its position relative to and spaced above the mold 26 when the mold is at the press station 1. The press plunger is supported in a horizontal arm 27 (Figs. 1 and 2) mounted on the column 16 and a pair of standards 30. When a mold unit is brought to the pressing station 1, the mold constituents (except the press plunger 29) are clamped down by clamping fingers 31 and 32 which extend over projections or ledges 33 formed on the shell 28. The fingers 31 and 32 are connected by pivots 34 to stationary brackets on the machine frame. The fingers are operated by piston motors 35 and 36, the pistons of which have link connections 37 with said fingers. The motors 35 and 36 may be operated by air pressure.

When the mold table is indexed to bring a mold assembly to the press station 1, the shell 28 is brought beneath the fingers 34. The cylinders 35 and 36 then operate to lift their pistons and thereby apply downward clamping pressure of the fingers 31 on the shell 28 thus holding the mold parts 26, 27 tightly clamped together during the press molding of the article and the lifting of the press plunger. With this construction the usual spring pressed plates or means for holding the mold parts during the movements of the press plunger are rendered unnecessary.

When the mold with the molded article therein is brought to the take-out station 4 the shell and ring assembly 28, 27, is lifted away from the mold 26 and molded article 25, permitting the operator to remove the molded article from the machine. The lifting device comprises a horizontal plate 40 connected to the piston rod 41 of an air-operated piston motor or cylinder 42. The cylinder is carried by a bracket 43 fixed to the column 16. The plate 40 is formed with hooked end portions 44 to receive the ledges 33 as the mold units move into position beneath the lifting plate 40. The motor 42 is operated periodically in alternation with the step movements of the mold table for lifting each molding ring 20 and shell 28 at the takeout station.

Modifications may be resorted to within the spirit and scope of my invention as defined in the appended claims.

I claim:

1. A turret-type press molding machine comprising a mold table mounted for rotation about a vertical axis, mold units mounted on said table for rotation therewith and equally spaced circumferentially of the mold table, each unit comprising a body mold and a ring mold positioned over the body mold and forming therewith a mold cavity, means for rotating the mold table intermittently, step by step, and thereby bringing each mold unit to rest at a plurality of stations including a press molding station and a take-out station, a press plunger mounted for vertical reciprocation at the press molding station, means for reciprocating the plunger, the plunger including a molding head movable downwardly into the mold cavity when the plunger is moved downward for press molding a charge of glass within the mold cavity, holding fingers having a stationary mounting at the press molding station, said holding fingers being pivotally mounted for angular movement in a vertical plane, fluid operated cylinders operatively connected to said fingers for angularly and pivotally moving them into position to clamp each ring mold in succession to the body mold and hold it in said position during the press molding operation, lifting means at the take-out station comprising a lifting plate, a piston motor connected to said plate for lifting and lowering it, said plate comprising means for connecting it to each ring mold as the latter is brought to the take-out station, said piston motor being operative to lift the ring mold away from the body mold at the take-out station and thereby permit removal of the molded article from the machine.

2. The machine defined in claim 1, the number of said stations being an odd number and the stations being spaced apart at angular distances around the axis of the mold table each one-half of the angular distance through which the mold table is moved during each step rotation, the take-out station being at an odd number of station spaces beyond the press molding station whereby each mold unit is only brought to rest at the take-out station after more than one complete rotation beyond the press molding station.

3. A turret-type machine for press molding hollow glass articles comprising a mold table mounted for rotation about a vertical axis, a plurality of mold units mounted on said table and adapted to be moved to and through a series of operating stations, each of said mold units comprising a body member and a ring member combined to form a mold cavity, a press plunger mounted for up-and-down movement at a pressing station, said plunger including a molding head movable into the said combined mold for molding an article therein, clamping means common to all said molds at said pressing station, said clamping means comprising clamping fingers adapted to clamp said ring members on the body members under pressure, said clamping fingers each having pivotal mounting separate from and stationary with respect to the mold table and positioned over a portion of the path of said ring members, a plurality of fluid operated motors individual to each clamping member and operatively connected to said clamping fingers, said motors being operative to alternately move the clamping fingers into and out of pressure contact with the ring members as they are successively presented and are at rest at the pressing station.

4. The combination set forth in claim 3, including a take-out device mounted separate from and above the mold table and positioned at a take-out station, the ring members being brought singly and in succession beneath and into operative connection with said take-out device by rotation of the mold table, and a motor connected to said take-out device for lifting the latter and thereby lifting each ring member successively into raised position to permit the removal of the molded article at the take-out station.

References Cited in the file of this patent

UNITED STATES PATENTS

| | | |
|---|---|---|
| D. 124,656 | Stewart et al. | May 14, 1941 |
| 162,791 | Beck | May 4, 1875 |
| 794,179 | Holston | July 11, 1905 |
| 1,213,853 | Ferngren | Jan. 30, 1917 |
| 1,292,033 | Peiler | Jan. 21, 1919 |
| 1,501,868 | Said et al. | July 15, 1924 |
| 1,594,531 | Kucera | Aug. 3, 1926 |
| 1,642,722 | Davis | Sept. 20, 1927 |